No. 757,331. PATENTED APR. 12, 1904.
A. MEAD.
REVERSING MECHANISM.
APPLICATION FILED OCT. 31, 1903.

NO MODEL.

WITNESSES
William B. Poor.
F. H. Houston.

Arthur Mead
INVENTOR
BY Ellis Spear Jr.
Attorney.

No. 757,331.

Patented April 12, 1904.

UNITED STATES PATENT OFFICE.

ARTHUR MEAD, OF BRIDGETON, MAINE.

REVERSING MECHANISM.

SPECIFICATION forming part of Letters Patent No. 757,331, dated April 12, 1904.

Application filed October 31, 1903. Serial No. 179,277. (No model.)

*To all whom it may concern:*

Be it known that I, ARTHUR MEAD, a citizen of the United States, residing at Bridgeton, county of Cumberland, State of Maine, have invented certain new and useful Improvements in Reversing Mechanisms, of which the following is a specification.

This invention relates to reversing mechanisms for screw-propellers, and particularly for vessels employing an engine to drive the same, which is not adapted to be reversed.

It is the object of the present invention to provide a reversing mechanism which shall be simple and efficient and so act as to take advantage of the resistance of the water to the screw to keep the parts fully and positively engaged at all times. To this end the propeller-shaft is made in two parts, one of which, carrying the propeller, is movable longitudinally. A train of reversing-gears and a double clutch are provided to connect these two shafts for driving them in the opposite or same directions, respectively. The reversing-gears are mounted in a non-rotatable casing, which moves slightly with the propeller-section of the shaft when it is shifted by the lever to make the necessary connections in going astern.

Figure 1:
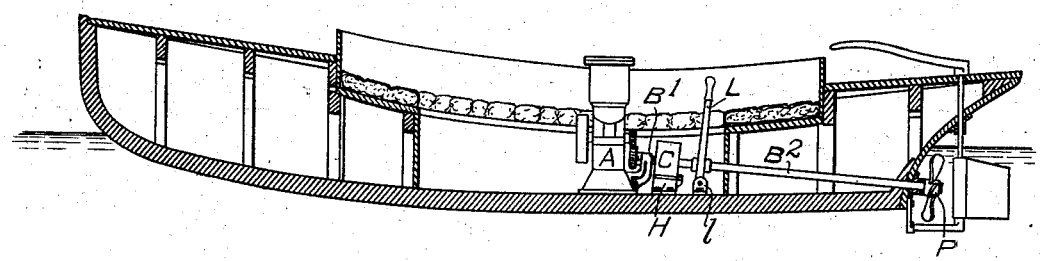
Figure 2:
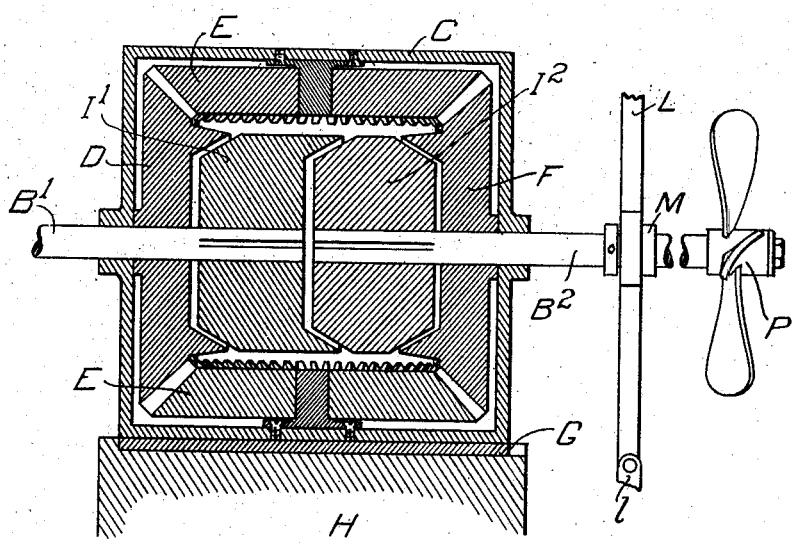

In the drawings, in which like letters of reference indicate corresponding parts throughout, Figure 1 is a section of a launch fitted with the reversing mechanism, and Fig. 2 is a section of the reversing mechanism proper.

A indicates an engine of any known type.

B' B² are respectively the engine and propeller sections of the shaft.

P is the propeller, and C is a casing containing a train of reversing-gears D, E, and F, of which E are mounted on studs and D and F are free on the propeller-shaft. The casing C is free to move on both of the shafts, but is held against rotation in the slot G in the block H, which is fastened to the bottom of the boat.

Upon the adjacent ends of the engine and propeller-shaft sections are keyed double-faced clutch members I' I², respectively. The gears D and F carry clutch members adapted to engage with the opposing faces of the clutch members I' I², respectively.

A hand-lever L, pivoted at $l$, engages the propeller-shaft at a collar M, which is fast thereon.

The engine being started and the parts being in the disconnected position shown in the drawings, if the lever is thrown forward the opposite faces of the clutch members on the ends of the two shaft-sections are brought together, and the propeller-section is rotated thereby. As the screw advances against the resistance of the water, the clutch members are firmly pressed and held together, and the greater the resistance the more firmly are they held. To reverse the propeller, the hand-lever L is thrown back in its extreme position. By this movement the faces of the clutch members I' I² are disengaged and the opposite face of the clutch $l^2$ on the propeller-section is brought into contact on the gear F and the casing C is slid slightly, so that the clutch-section on the gear D engages the opposing face of the clutch I'. The gear D being thereby set in rotation and the gear F being reversed through the gears E, the propeller-section of the shaft through its clutch $I^2$ will be rotated in the opposite direction—*i. e.*, to go astern. In this direction also, the tendency of the propeller being to pull, the clutch $I^2$ is held in close contact with the gear F and the greater resistance the boat offers the more tightly will these members be drawn. If it be desired to stop the propeller without stopping the engine, the hand-lever L is returned to its central position, in which the clutch member $I^2$ is free from the clutch I' or the clutch-face or the gear F.

The clutch members indicated in the drawings are what is commonly known as "friction-clutches," as they have been found best for these members; but various forms of clutches might be substituted therefor and various changes made in the connections, as the permanent engagement of the clutch I' with the gear E and the omission of the sliding feature of the casing, without departing from the spirt of my invention.

What I therefore claim, and desire to secure by Letters Patent, is—

1. In a reversing mechanism for launches, a longitudinally-movable propeller-shaft having a double-faced clutch on one end, an engine-shaft having a clutch member to engage therewith, a train of reversing-gears held against rotation with the shafts, the reversed gear also having a clutch member, and means for shifting the propeller-shaft longitudinally.

2. In a reversing mechanism for launches, a longitudinally-movable propeller-shaft having a double-faced clutch on one end, an engine-shaft in line with said propeller-shaft, having a clutch member to engage therewith, a train of reversing-gears held against rotation, the reversing-gear also having a clutch member, and means for shifting the propeller-shaft longitudinally to engage either clutch.

3. In a reversing mechanism, a driven shaft having a clutch member, a train of reversing-gears held against rotation with the shafts, a clutch member on the reversed gear thereof, a second shaft longitudinally movable in line therewith, a clutch member thereon adapted to engage with said first-mentioned clutch member and with the clutch member on the reversed gear, and means to move the second shaft.

4. In a reversing mechanism, a power-shaft having a double-faced clutch member, a train of reversing-gears held against rotation therewith but slightly movable longitudinally thereof, a clutch member on each of two of the oppositely-moving gears of said train, a second shaft longitudinally movable in line with the first shaft, a double-faced clutch member thereon, and means to move said second shaft so that it may be driven by the power-shaft directly, or indirectly through the gears.

5. In a reversing mechanism, a driven shaft having a double-faced clutch member, a gear loosely mounted on said shaft and having a clutch member on its face, a second shaft longitudinally movable in line therewith, a double-faced clutch member thereon adapted to engage with said first-mentioned clutch member, a second loosely-mounted gear on the said second shaft and provided with a clutch member, reversing means between the first and second gears, and means to move the shaft to engage the driven shaft or the said clutch member on the said second gear, said train of gears being held against rotation with said shafts, but slidable relative thereto.

In testimony whereof I affix my signature in presence of two witnesses.

ARTHUR MEAD.

Witnesses:
 GEO. N. BURNHAM,
 JOHN W. BERTWELL.